United States Patent [19]
Harris, III et al.

[11] Patent Number: 5,211,254
[45] Date of Patent: May 18, 1993

[54] MOTORIZED WHEELBARROW WITH MULTIPLE SPEED TRANSMISSION

[75] Inventors: Isaac E. Harris, III, Durham; Douglas O. Deal, Bahama, both of N.C.

[73] Assignee: E-Z Haul Corporation, Durham, N.C.

[21] Appl. No.: 770,556

[22] Filed: Oct. 3, 1991

[51] Int. Cl.$^5$ .............................. B62D 51/04
[52] U.S. Cl. .................... 180/19.1; 280/47.23
[58] Field of Search ............. 180/19.1, 19.3; 280/47.31; 74/375, 359

[56] References Cited

U.S. PATENT DOCUMENTS

| | | | |
|---|---|---|---|
| 2,138,239 | 11/1938 | Irgens | 180/19 |
| 2,253,288 | 8/1941 | De Lucchi | 180/19.1 |
| 2,533,549 | 1/1947 | Bell | 293/2 |
| 2,601,752 | 7/1952 | Rose | 56/26 |
| 2,740,246 | 4/1956 | Smith et al. | 180/19.1 |
| 3,220,043 | 11/1965 | Lampe | 15/340 |
| 3,719,247 | 3/1973 | Hollis | 180/19 |
| 3,891,043 | 6/1975 | Valdex | 180/19.1 X |
| 3,950,005 | 4/1976 | Patterson | 280/47.31 |
| 4,342,369 | 8/1982 | Ransom | 180/19.3 |
| 4,354,564 | 10/1982 | Watanabe et al. | 180/19 |
| 4,412,595 | 11/1983 | Kinzel | 180/211 |
| 4,456,277 | 6/1984 | Carpenter | 180/205 |
| 4,589,508 | 5/1986 | Hoover et al. | 180/19.1 |
| 4,624,027 | 11/1986 | Martin | 15/340 |

FOREIGN PATENT DOCUMENTS 2366972 5/1978 France ................. 180/19.1

Primary Examiner—Margaret A. Focarino
Assistant Examiner—Victor E. Johnson
Attorney, Agent, or Firm—Richard E. Jenkins

[57] ABSTRACT

A motorized wheelbarrow employing a lightweight and small displacement engine and multi-speed transmission to drive the wheel of the wheelbarrow. The multi-speed transmission permits use of a lightweight and small displacement engine which has been set to operate at a constant predetermined peak power RPM so as to provide power to the wheelbarrow at both low and relatively high rates of speed.

14 Claims, 4 Drawing Sheets

MOTORIZED WHEELBARROW WITH MULTIPLE SPEED TRANSMISSION

TECHNICAL FIELD

The present invention relates to a wheelbarrow which is equipped with a lightweight engine and multiple speed transmission assembly which is adapted to propel the wheelbarrow without significantly affecting the weight or functionality thereof.

RELATED ART

The utility of wheelbarrows is very well known to those involved in construction work such as commercial building construction and road construction as well as to the casual domestic user thereof. The wheelbarrow is a unique implement since, due to its single wheel construction, a relatively heavy load may be balanced thereover and the wheelbarrow and load then pushed forward without the requirement of expending a large amount of energy. Moreover, the wheelbarrow lends itself particularly well to maneuvering a load over difficult terrain and/or a narrow pathway where other methods of load conveyance would not be practical.

In view of the advantages inherent in the use of a wheelbarrow for easily transporting heavy loads, a number of attempts have been made to date to successfully motorize the wheelbarrow by utilizing a gasoline engine in order to propel the wheelbarrow and load carried thereby These efforts include the wheelbarrow disclosed in U.S. Pat. No. 2,533,549 to Bell incorporating an air cooled gasoline motor and power transmission mechanism affixed to the wheelbarrow to provide motivation to the wheelbarrow. A clutch control lever is included as an attachment to one handle for operator control of the transmission clutch, and an engine throttle governor control lever is included at the other handle to allow the operator to adjust the engine to various RPM's for the purpose of controlling the speed of the wheelbarrow.

U.S. Pat. No. 4,589,508 to Hoover et al. discloses a motorized wheelbarrow utilizing a gasoline engine which drives the front wheel through a friction drive transmission mechanism which is adapted to allow the wheelbarrow to be powered in either a forward or reverse direction. The friction drive mechanism comprises a rubber friction wheel which may be urged against a forward movement drive plate or a rear movement drive plate or, alternatively, positioned in neutral therebetween by a control lever on one handle of the wheelbarrow. The speed of the wheelbarrow is controlled by a throttle lever which is mounted on the other handle of the wheelbarrow and in combination with the friction drive lever allows for the engine to be slowly and gradually engaged and the wheelbarrow to be accelerated slowly to avoid disrupting the load carried thereby.

Unfortunately, all of the motorized wheelbarrows known to applicant suffer from disadvantages which detract from the additional utility provided by the motorization thereof. Applicant has observed that large and heavy engines with direct chain or belt drives to the front wheel have been adapted to the wheelbarrow in order to facilitate carrying loads which in many circumstances can exceed 300 pounds and more, particularly in commercial building construction and road development applications. In the past, a large and correspondingly heavy gasoline engine was believed necessary due to the use of a direct drive from the engine to the wheel. Thus, typically, the gasoline engine driven wheelbarrow required a throttle device to control the speed so as to slow down the wheelbarrow when going downhill and to speed up the linear speed of the wheelbarrow when traversing level terrain.

As is well known to those familiar with gasoline engines, in order to control speed by means of a throttle it is necessary to change the gasoline engine rotational speed (as measured in revolutions per minute or RPM). Since engine horsepower and engine RPM are directly related, as the engine throttle reduces the gasoline engine RPM, the available horsepower of the engine is also correspondingly reduced. Therefore, to operate a motorized vehicle at slow speeds a relatively large and heavy gasoline engine must be used in order to have sufficient horsepower to motivate a heavy load at low RPM slower speeds. The use of such a large engine results in both undesirable excessive weight and undesirable inefficiency since at the higher RPM engine speeds required for faster linear movement excess horsepower is available which is not required to motivate the wheelbarrow. Consequently, the conventional large displacement and heavy gasoline engine utilized to motivate a motorized wheelbarrow by means of a direct belt or chain drive is a very inefficient means by which to power the wheelbarrow. Moreover, additional problems are inherent with the large displacement and heavy engines utilized in conventional motorized wheelbarrows since the loaded wheelbarrow can typically no longer be easily lifted upwardly in order to dump a load due to the motorized wheelbarrow being too heavy. In order to compensate for this problem modifications must be made to the wheelbarrow load bed which typically render the wheelbarrow less useful for many applications than a conventional non-powered wheelbarrow.

Recognizing the shortcomings of prior art motorized wheelbarrows, applicant has developed a novel improved motorized wheelbarrow which also meets the same desirable performance characteristics inherent in a non-powered wheelbarrow. Applicant's motorized wheelbarrow utilizes a lightweight engine and transmission assembly so as to possess the functionality of a non-powered wheelbarrow while still possessing sufficient power to drive the wheelbarrow at both slow speeds and at relatively high linear speeds.

DISCLOSURE OF THE INVENTION

In accordance with the present invention, applicant provides a motorized wheelbarrow comprising a frame including a pair of spaced-apart handles each having a proximal and distal end and a pair of downwardly depending support legs. A wheel is secured to the distal ends of the spaced-apart handles for bearing the load of the wheelbarrow when the proximal ends of the handles are lifted, and mounting means is secured to the frame for supporting a drive engine. Drive means is secured to the mounting means for driving the wheel and comprises: a gasoline engine having a displacement between about 15 and 60 cubic centimeters and adapted to operate at a substantially constant predetermined speed; a multiple speed transmission operatively connected to the engine to facilitate a selective change in linear speed of the wheelbarrow while the engine maintains the substantially constant speed; and means connecting the transmission and the wheel for driving the wheel. A load bed is attached to the frame for receiving a load to be transported by the novel and improved motorized wheelbarrow.

It is therefore the object of the present invention to provide a lightweight motorized wheelbarrow which can be utilized in substantially the same manner as a conventional non-powered wheelbarrow; It is another object of the present invention to provide a motorized wheelbarrow comprising a lightweight and small displacement gasoline engine and multiple speed transmission to efficiently motivate the wheelbarrow without adding significantly to the weight or diminishing the functional capabilities thereof.

It is yet another object of the present invention to provide a motorized wheelbarrow utilizing a lightweight and small displacement gasoline engine and multiple speed transmission wherein the gasoline engine is adapted to operate at a substantially constant peak power predetermined speed so as to have sufficient power for low speed motivation of the wheelbarrow and yet not to have excessive power at high speed motivation of the wheelbarrow.

It is still another object of the present invention to provide a motorized wheelbarrow incorporating a unique clutch engagement mechanism on one handle thereof which engages the clutch when the wheelbarrow is pushed forwardly and disengages the clutch when the wheelbarrow is stopped.

DESCRIPTION OF THE DRAWINGS

Some of the objects of the invention having been stated, other objects will become evident as the description proceeds, when taken in connection with the accompanying drawings in which.

BEST MODE FOR CARRYING OUT THE INVENTION

Figure 1:
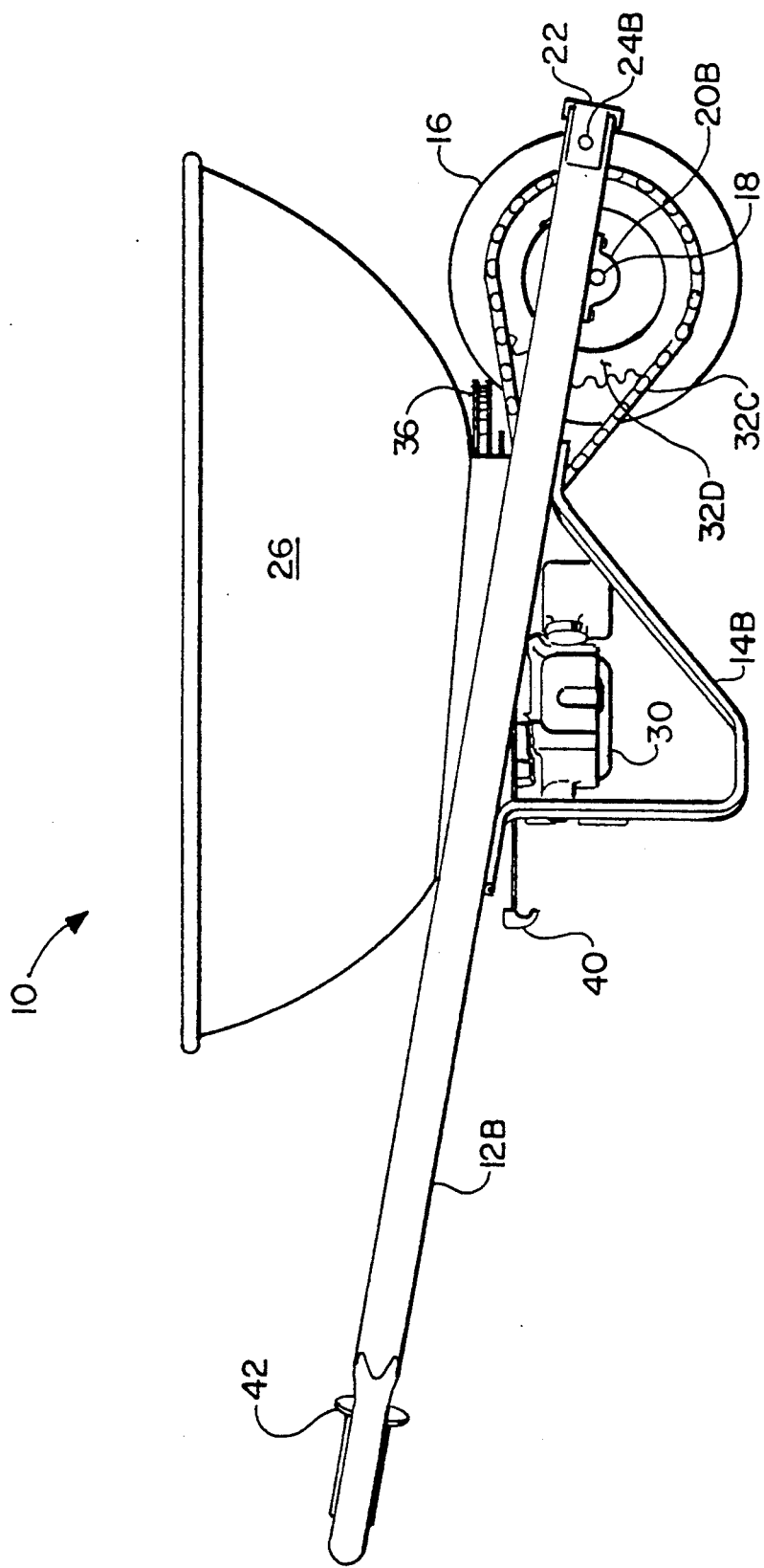
FIG. 1 is a side elevation view of the motorized wheelbarrow of the present invention.
Figure 2:
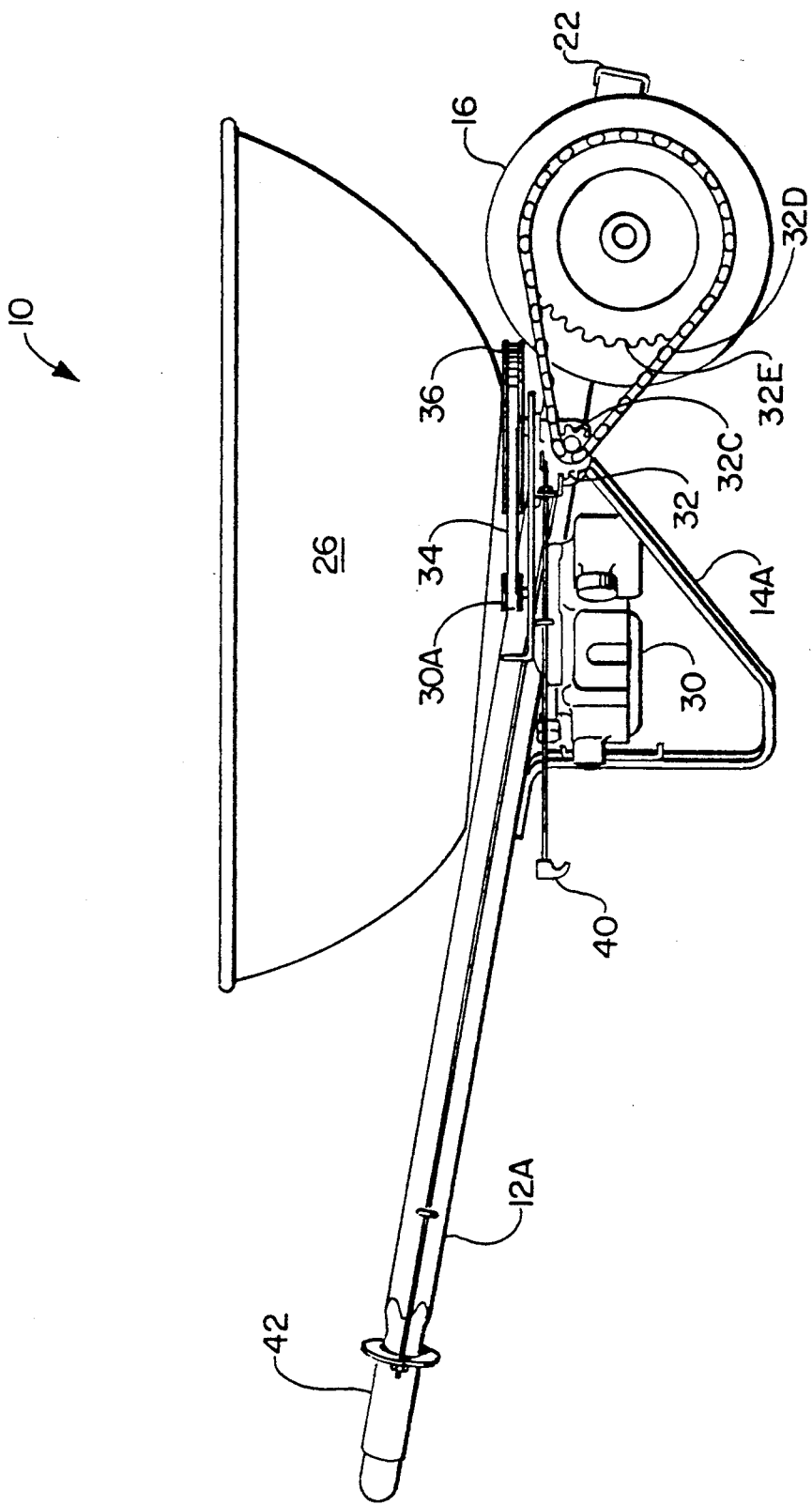
FIG. 2 is a side elevation view of the motorized wheelbarrow of the present invention with one handle removed for greater clarity of illustration of the drive assembly.

The present invention can be best understood by reference to FIGS. 1–4 of the drawings wherein like parts are designated with like numerals throughout.

Referring now to the drawings, the motorized wheelbarrow of the invention is generally designated 10. Wheelbarrow 10 possesses unexpected and surprising utility due to the unique combination of a conventional wheelbarrow and a very lightweight and small displacement gasoline engine and multiple speed transmission drive assembly which powers the wheelbarrow at selected low as well as higher speeds without adversely affecting the functionality of the conventional wheelbarrow. The surprising ability to power the wheelbarrow with a lightweight and small displacement gasoline engine is achieved by adapting the engine to operate at a substantially constant peak power RPM and to provide the power to the drive wheel through a multiple speed manual transmission. The specifics of the invention will be appreciated with reference to the detailed description further provided hereinbelow.

The motorized wheelbarrow 10 comprises a conventional wheelbarrow constructed of handles 12A, 12B which have legs 14A, 14B, respectively, secured thereto and depending downwardly therefrom upon which the wheelbarrow may be supported while in a stationary position. Handles 12A, 12B converge and at the lowermost ends thereof wheel 16 is rotatably mounted therebetween so as to support the weight of the wheelbarrow when handles 12A, 12B are lifted by the user. Wheel 16 is rotatably mounted to handles 12A, 12B by means of axle 18 which is secured at each end thereof in suitable axle brackets 20A, 20B (see FIG. 4). Axle brackets 20A, 20B are affixed to the under side of handles 12A, 12B, respectively. Of course, wheel 16 may be rotatably mounted between the lowermost converging ends of handles 12A, 12B by any other suitable means which would be well known to those skilled in the wheelbarrow construction art.

Mounted immediately forwardly of wheel 16 is a bracket or bumper bar 22 which is affixed at each end thereof to a corresponding one of the lowermost ends of handles 12A, 12B by corresponding bolts 24A, 24B. Finally, load bed 26 is provided as a part of the conventional portion of motorized wheelbarrow 10 and is suitably secured to handles 12A, 12B by bolts (not shown) which extend through the bottom of load bed 26 into handles 12A, 12B in accordance with conventional non-powered wheelbarrow construction.

Thus far the description of motorized wheelbarrow 10 describes a conventional non-powered wheelbarrow. However, applicant has now combined therewith a unique lightweight drive assembly which fits unobtrusively beneath load bed 26 and adds only about 8–10 pounds to the total weight of the wheelbarrow which is typically about 70 pounds. Despite its small size and light weight, the drive assembly serves to provide sufficient power to motivate motorized wheelbarrow 10 at both low initial speeds as well as relatively high speeds across unobstructed terrain. Thus, motorized wheelbarrow 10 is similar in appearance to a non-powered wheelbarrow and possesses similar handling capabilities with respect to lifting and dumping as does a conventional non-powered wheelbarrow. The specifics of the lightweight drive assembly which renders the instant motorized wheelbarrow a significant advancement over previous efforts at motorizing wheelbarrows will be more fully appreciated with reference to the detailed description hereinafter.

Figure 3:
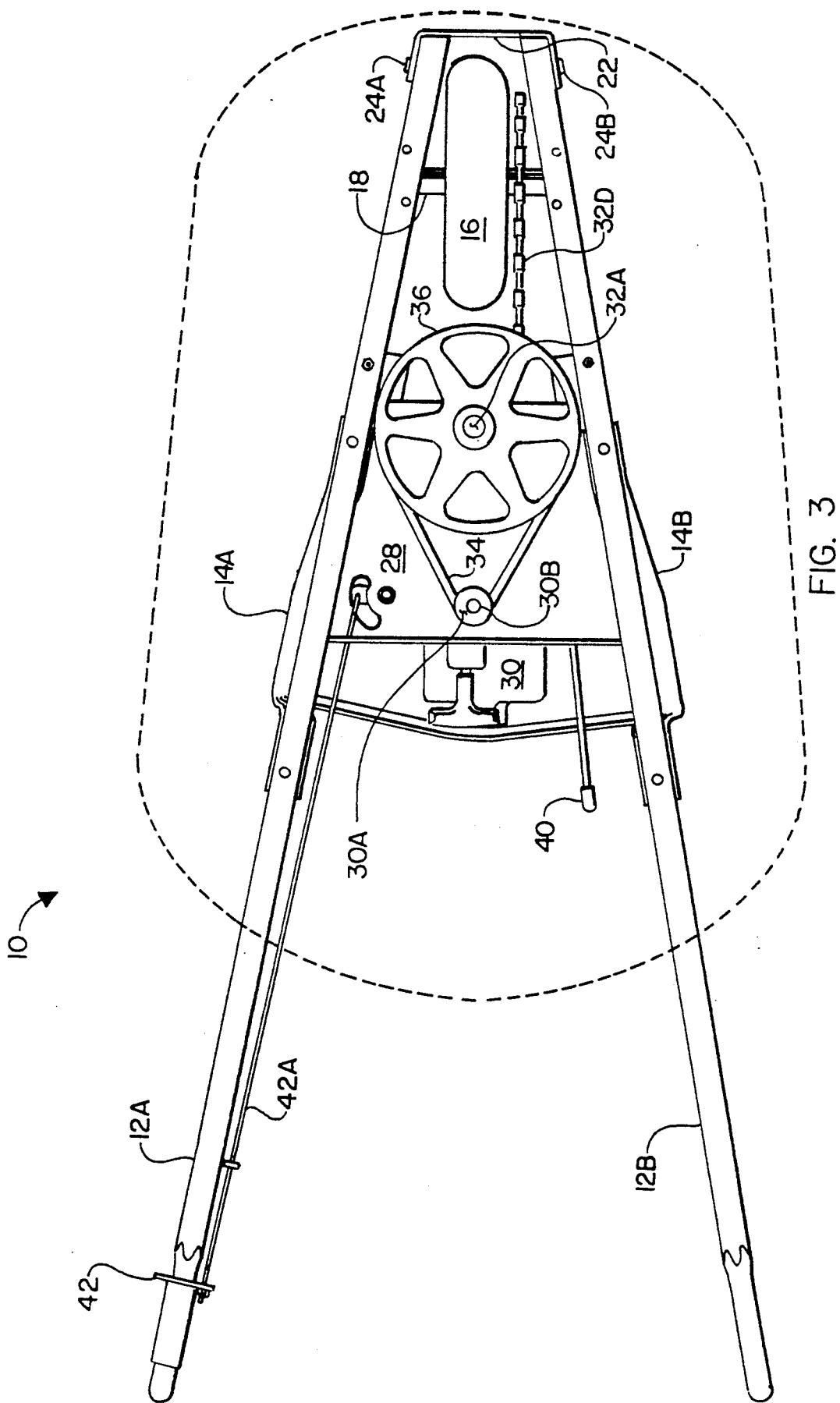
FIG. 3 is a top plan view of the motorized wheelbarrow of the present invention with the load bed removed and the outline thereof shown only in phantom lines in order to better illustrate the drive assembly.
Figure 4:
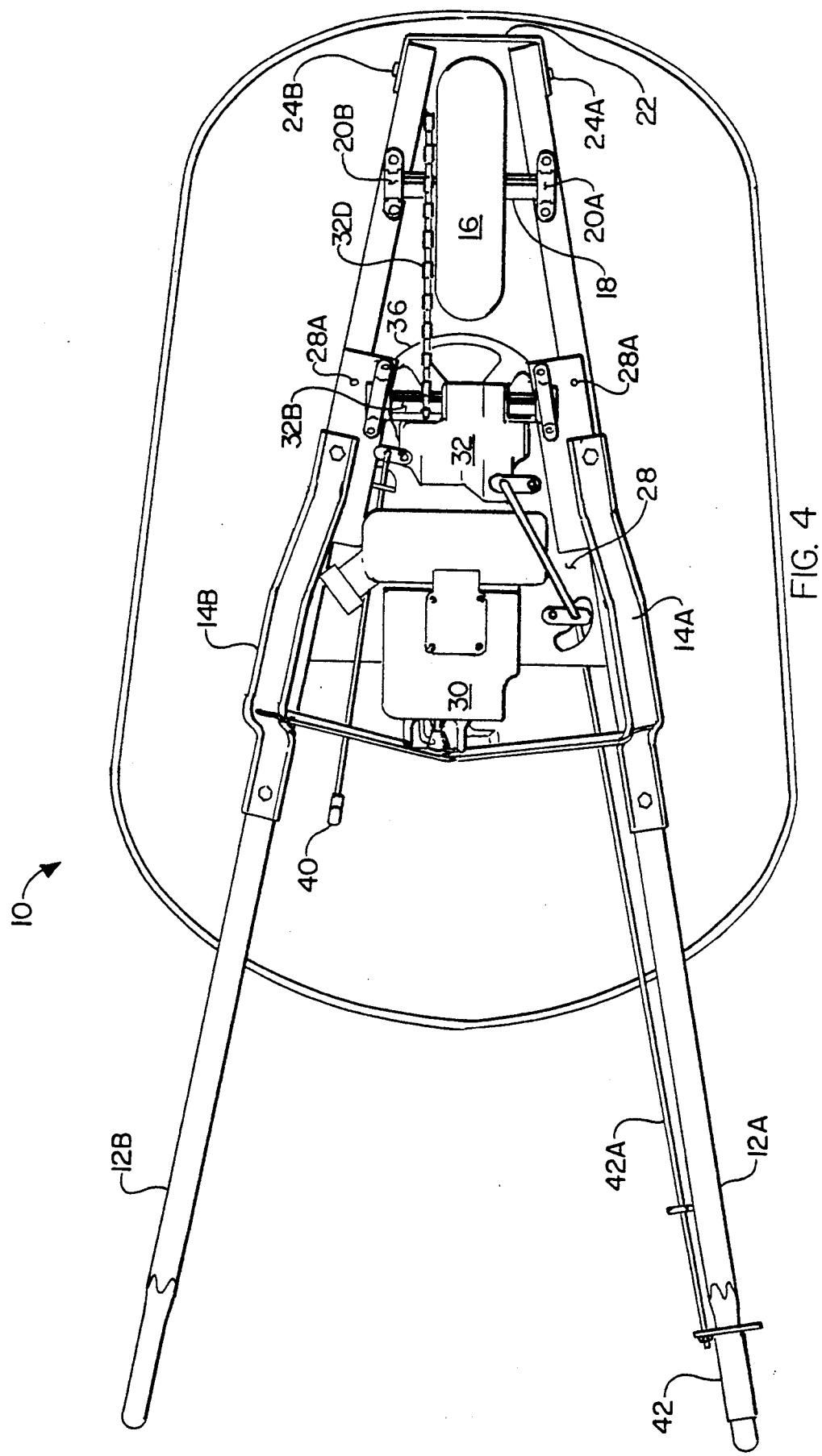
FIG. 4 is a bottom plan view of the motorized wheelbarrow of the present invention.

The motor assembly which applicant contemplates attaching to the above-described conventional wheelbarrow comprises a mounting plate 28 which extends between the medial portion of handles 12A, 12B and is securely mounted thereto by means of bolts 28A which secure mounting plate 28 to the underside of handles 12A, 12B (see FIGS. 3 and 4). A lightweight and small displacement 2-cycle engine 30 (most suitable a HOMELITE 2-cycle engine with a displacement of 30 cubic centimeters) is secured beneath load bed 26 to mounting plate 28. A miniaturized multiple speed manual transmission 32 (preferably a Kansaki Model KL-3 (MOD) 3-speed transmission) is operatively connected to engine 30.

Engine 30 is pre-set with a fixed governor to operate at its peak power RPM (approximately 8600 RPM) and the gearing ratio of multiple speed transmission 32 is selected so as to allow the engine to be operated at its peak power RPM irrespective of which the multiple speeds of the transmission is selected by the user. In this fashion maximum work can be accomplished with absolutely minimum horsepower and minimum engine and drive assembly weight. Also, since engine 30 is of the type utilized on chainsaws and motorized weed cutting apparatus, it can be operated at any angle without concern regarding spillage of gasoline or oil and thus motorized wheelbarrow 10 can be used and dumped in the same manner as conventional non-powered wheelbarrows.

With reference again to the drawings, it can be appreciated that engine 30 drives transmission 32 by means of pulley 30A (see FIG. 3) which is mounted to the outer end 30B of the drive shaft of engine 30. A V-belt 34 extends from pulley 30A and around flywheel 36 which is affixed to the input shaft 32A of multiple speed transmission 32. The power transmitted from engine 30 through pulley 30A and V-belt 34 to flywheel 36 is thus introduced into transmission 32 through input shaft 32A. After the rotational speed of shaft 32A is suitably reduced by transmission 32, the output shaft 32B (see FIG. 4) serves to drive sprocket 32C and chain 32D (see FIG. 2). Chain 32D extends around driven sprocket 32E which is fixedly mounted to axle 18 and thus serves to impart rotational movement to wheel 16 also mounted to axle 18.

With particular reference now to FIGS. 3 and 4, it can be further appreciated that a gear shift lever 40 is provided beneath load bed 26 and connected at one end to transmission 32 and extends generally outwardly therefrom towards the upper end of handles 12A, 12B. Gear shift 40 serves to select the gear (first, second, or third gear of 3-speed multiple speed transmission 32) which determines the linear speed of motorized wheelbarrow 10 since engine 30 is set to operate at a constant peak power RPM (typically about 8600 RPM).

Also, transmission 32 includes a clutch (not shown) within the housing thereof which is operated by means of sleeve 42 slidably mounted upon the upper end of handle 12A and operatively connected to the clutch of transmission 32 by means of linkage 42A which extends from sleeve 42 through mounting plate 28 and to transmission 32. Sleeve 42 and linkage 42A is constructed so that the transmission clutch will be engaged when sleeve 42 is pushed forwardly during normal forward movement of motorized wheelbarrow 10 and the clutch will be disengaged when sleeve 42 is slidably urged rearwardly relative to handle 12A when the user desires to stop forward movement of motorized vehicle 10. Thus, the natural forward and rearward force applied to handles 12A, 12B serves to engage the clutch of transmission 32 during forward movement of motorized wheelbarrow 10 and to disengage the clutch when forward movement of the wheelbarrow is terminated. This unique clutch actuation serves to further allow one to use motorized vehicle 10 much as one would a conventional non-powered wheelbarrow and to retain all of the advantages thereof with respect to loading and unloading while still having the benefit of being motorized.

Thus, applicant has developed a modification to the conventional non-powered wheelbarrow which provides for a lightweight motorized wheelbarrow which has all the advantages of being motorized while still maintaining the advantages inherent to a relatively lightweight non-powered wheelbarrow.

It will be understood that various details of the invention may be changed without departing from the scope of the invention. Furthermore, the foregoing description is for the purpose of illustration only, and not for the purpose of limitation—the invention being defined by the claims.

What is claimed is:

1. A motorized wheelbarrow for transporting a load comprising:
   a frame including a pair of spaced-apart handles each having a proximal and distal end and a pair of downwardly depending support legs;
   a wheel secured to the distal ends of said spaced-apart handles for bearing the load of said wheelbarrow when the proximal ends of said handles are lifted;
   mounting means secured to said frame for supporting a drive engine, said mounting means comprising a platform secured at each of the opposing sides thereof to a respective one of said pair of handles;
   drive means secured to said mounting means for driving said wheel and comprising: a gasoline engine having a displacement between about 15 and 60 cubic centimeters and adapted to operate at a substantially constant predetermined speed mounted to one side of said platform; a multiple speed transmission mounted to said one side of said platform; speed reduction means mounted on the other side of said platform operatively connecting said engine and said transmission to facilitate a selective change in linear speed of said wheelbarrow while said engine maintains said substantially constant speed; and means connecting said transmission and said wheel for driving said wheel; and
   a load bed attached to said frame.

2. A motorized wheelbarrow according to claim 1 wherein said gasoline engine is a two cycle engine.

3. A motorized wheelbarrow according to claim 2 wherein said constant predetermined engine speed is the speed at which the engine achieves maximum power.

4. A motorized wheelbarrow according to claim 1 wherein said multiple speed transmission is a three speed manual transmission.

5. A motorized wheelbarrow according to claim 4 wherein said transmission includes a shifter lever operatively connected at one end to said transmission and extending generally outwardly towards the proximal ends of said handles.

6. A motorized wheelbarrow according to claim 1 wherein said multiple speed transmission includes a manually actuated clutch.

7. A motorized wheelbarrow according to claim 6 wherein said clutch is actuated by a slidable movable hand control mounted on the proximal end of one of said pair of handles.

8. A motorized wheelbarrow according to claim 1 wherein said means connecting said transmission and said wheel comprises a sprocket and chain drive assembly.

9. A motorized wheelbarrow for transporting a load comprising;
   a frame including a pair of spaced-apart handles each having a proximal and distal end and a pair of downwardly depending support legs;
   a wheel secured to the distal ends of said spaced-apart handles for bearing the load of said wheelbarrow when the proximal ends of said handles are lifted;
   mounting means secured to said frame for supporting a drive engine, said mounting means comprising a platform secured at each of the opposing sides thereof to a respective one of said pair of handles;

drive means secured to said mounting means for driving said wheel and comprising: a gasoline engine having a displacement between about 15 and 60 cubic centimeters and adapted to operate at a substantially constant predetermined speed; a multiple speed manual transmission and operatively connected shifter lever to facilitate a selective change in linear speed of said wheelbarrow while said engine maintains said substantially constant speed; a manually actuated clutch actuated by a slidably movable hand control mounted on the proximal end of one of said pair of handles operatively connected to said transmission; speed reduction means operatively connecting said engine and said transmission; and means connecting said transmission and said wheel for driving said wheel, wherein said engine and transmission are mounted to one side of said platform and said speed reduction means are mounted on the other side of said platform; and a load bed attached to said frame.

10. A motorized wheelbarrow according to claim 9 wherein said gasoline engine is a two cycle engine.

11. A motorized wheelbarrow according to claim 10 wherein said constant predetermined engine speed is the speed at which the engine achieves maximum power.

12. A motorized wheelbarrow according to claim 9 wherein said multiple speed transmission is a three speed manual transmission.

13. A motorized wheelbarrow according to claim 9 wherein said transmission shifter lever is operably connected at one end to said transmission and extends generally outwardly towards the proximal ends of said handles.

14. A motorized wheelbarrow according to claim 9 wherein said means connecting said transmission and said wheel comprises a sprocket and chain drive assembly.

* * * * *